United States Patent
Ghaem et al.

[19]

[11] Patent Number: 6,161,761
[45] Date of Patent: Dec. 19, 2000

[54] CARD ASSEMBLY HAVING A LOOP ANTENNA FORMED OF A BARE CONDUCTOR AND METHOD FOR MANUFACTURING THE CARD ASSEMBLY

[75] Inventors: Sanjar Ghaem, Palatine; Grace O'Malley, Hoffman Estates; Kiron Gore, Libertyville, all of Ill.

[73] Assignee: Motorola, Inc., Schaumburg, Ill.

[21] Appl. No.: 09/112,585

[22] Filed: Jul. 9, 1998

[51] Int. Cl.[7] .................................................. G06K 19/06
[52] U.S. Cl. ......................... 235/492; 235/380; 235/488; 343/866; 343/873
[58] Field of Search .................................... 235/492, 380, 235/488, 451, 493, 449; 343/742, 866, 873

[56] References Cited

U.S. PATENT DOCUMENTS

| | | | |
|---|---|---|---|
| 4,583,099 | 4/1986 | Reilly et al. | 343/572 |
| 4,598,276 | 7/1986 | Tait | 340/572 |
| 4,859,991 | 8/1989 | Watkins et al. | 340/572 |
| 4,897,534 | 1/1990 | Haghiri-tehrani | 235/488 |
| 4,999,742 | 3/1991 | Stampfli | 361/400 |
| 5,237,165 | 8/1993 | Tingley, III | 235/492 |
| 5,378,857 | 1/1995 | Swailes | 174/251 |
| 5,528,222 | 6/1996 | Moskowitz et al. | 340/572 |
| 5,552,790 | 9/1996 | Gunnarsson | 342/51 |
| 5,598,032 | 1/1997 | Fidalgo | 257/679 |
| 5,608,417 | 3/1997 | De Vall | 343/895 |
| 5,640,004 | 6/1997 | Mardinian et al. | 235/492 |
| 5,671,525 | 9/1997 | Fidalgo | 29/600 |
| 5,710,421 | 1/1998 | Kokubu | 235/492 |
| 5,852,289 | 12/1998 | Masahiko | 235/492 |
| 5,963,177 | 10/1999 | Tuttle et al. | 343/872 |

*Primary Examiner*—Thien M. Le
*Assistant Examiner*—Daniel S Felten
*Attorney, Agent, or Firm*—Douglas D. Fekete

[57] ABSTRACT

A card assembly (10) comprises a polymeric layer (16) having a generally planar surface (24), an integrated circuit component (38) adjacent to the polymeric layer (16), and a loop antenna (24) formed of a bare conductor (32) having ends. The loop antenna (24) comprises a first section (26) embedded into the polymeric layer (16), a second section (28) embedded into the polymeric layer (16), and a transverse section (30) spaced apart from the first section (26) by a dielectric region. The transverse section (30) crosses the first section (26). The ends (34) are electrically coupled to the integrated circuit component (38). The dielectric region preferably comprises a reflowed flash region of the polymeric layer (16) such that the transverse section (30) is encapsulated within the polymeric layer (16). Alternately, the dielectric region comprises a dielectric insert separating the transverse section from the first section.

35 Claims, 4 Drawing Sheets

CARD ASSEMBLY HAVING A LOOP ANTENNA FORMED OF A BARE CONDUCTOR AND METHOD FOR MANUFACTURING THE CARD ASSEMBLY

BACKGROUND OF THE INVENTION

This invention relates to a card assembly having a loop antenna formed of a bare conductor and a method for manufacturing the card assembly. More particularly, this invention relates to a card assembly, such as a smart card or the like, having a bare conductor loop antenna with at least one overlapping section of the loop.

Insulated copper wire is typically used to form multi-turn loop antennas for smart cards or the like. The electrical insulation of the insulated copper wire is typically applied using drawing or spraying methods, which creates a thin dielectric sheathing with some inherent porosity. A multi-turn loop antenna overlaps itself at least once at a cross-over region. The cross-over region is usually exposed to heat and pressure when multiple polymeric layers are laminated together to form a smart card. The exposure to heat and pressure may damage the relatively thin electrical insulation of the insulated wire. Consequently, a loop antenna with damaged insulation is prone to electrical shorting at the cross-over region. Electrical shorting results in an impedance mismatch between the loop antenna and the internal circuitry of the smart card. The impedance mismatch often leads to catastrophic failure of the smart card.

Several methods have been used to strip the insulation of the insulated wire at the ends of the loop antenna to make the ends receptive to an electrical connection to the internal circuitry of the smart card. Stripping methods may be generally categorized as mechanical, chemical, or thermal.

Mechanical stripping includes milling procedures, mechanical abrasion, and sand blasting. Mechanical stripping is often difficult to precisely control, particularly where wires have diameters of less than 8 mils. In addition, mechanical stripping produces debris which must be removed by vacuuming or other imperfect cleaning procedures.

Insulated copper wire may be milled to remove the insulation at its ends, after the insulated copper wire is embedded into a polymeric layer of the smart-card assembly. Ideally, wires with generally circular cross-sections are milled to produce wires with generally semi-circular cross sections. The rectilinear or flat portion of the milled wires readily accept a conductive medium (i.e. conductive adhesive) to form an electrical connection. However, milling the wires in such a manner may damage or destroy the fragile wires or leave contaminating residue from the milling process. The contamination residue may include polymeric smears from the insulation and metallic particles from the ends. Accordingly, milling of the wires may result in smart cards with intermittent or open electrical connections to the loop antenna.

Solvents are representative of typical chemical treatments from stripping the insulation. Ideally, solvents would selectively chemically attack the insulation without detrimentally affecting the surrounding polymeric layer of the card assembly. However, in practice the solvent may affect the structural integrity of the polymeric layer or cause a gummy residue from the insulation to remain on the ends of the loop antenna. Thus, dissolving the insulation with chemical solvents may result in an intermittent or open connection to the loop antenna caused by contamination from the gummy residue.

Thermal stripping uses heat to selectively remove the insulation from insulated wire. Thermal stripping may use a laser, which is targeted at the insulated wire, but yet secondarily heats the smart card. The laser often heats the smart card sufficiently to deform or warp the polymeric base of the smart card.

Thus, a need exists for a card assembly having a loop antenna with a reliable impedance, which is generally immune to electrical shorting at a cross-over region. Furthermore, a need exists for a loop antenna which does not require stripping of insulation, or is otherwise receptive to an electrically and mechanically sound connection to the internal circuitry of the card.

SUMMARY OF THE INVENTION

In accordance with the invention, a card assembly comprises a polymeric layer having a generally planar surface, an integrated circuit component adjacent to the polymeric layer, and a loop antenna formed of a bare conductor having ends. The loop antenna comprises a first section embedded into the polymeric layer, a second section embedded into the polymeric layer, and a transverse section spaced apart from the first section by a dielectric region. The transverse section crosses the first section. The ends are electrically coupled to the integrated circuit component. The dielectric region preferably comprises a reflowed flash region of the polymeric layer such that the transverse section is encapsulated within the polymeric layer. Alternately, the dielectric region comprises a dielectric insert separating and electrically insulating the transverse section from the first section. In a preferred embodiment, the first section of the loop antenna is defined as an inner turn, while the second section of the loop antenna comprises an outermost turn and an extension. However, in an alternate embodiment, the first section of the loop antenna is defined as the outermost turn, while the second section comprises the inner turn.

Another aspect of the invention involves a method for forming a card assembly comprising the steps of: (a) embedding a first section of a loop of bare conductor into a polymeric layer at a first depth; (b) embedding a second section of the loop into the polymeric layer at the first depth; (c) crossing the first section of the loop with a transverse section of the loop extending from the second section and separated from the first section; (d) spacing the transverse section from the first section by a dielectric region associated with the polymeric layer; (e) fabricating a substrate having conductive traces; (f) mounting an integrated circuit onto the substrate; and (g) electrically connecting the traces to the loop.

The bare conductor facilitates ready electrical connections to the loop antenna which do not require the stripping of insulation, as previously required for insulated wire antennas in cards. For a fixed outer diameter budget of the conductor in a card assembly, the bare conductor increases the potential quality factor (Q) of the loop antenna over prior art loop antennas using insulated wires. The potential Q of the loop antenna is increased by a differential increase in the conductive cross-sectional diameter of a bare wire versus an insulated wire. Moreover, for wires having outer diameters of approximately 5 to 7 mils, as are commonly employed in card assemblies, bare wire is easier to handle in manufacturing processes than comparable insulated wire of an equal outer diameter because the bare wire has greater structural integrity.

DESCRIPTION OF THE PREFERRED EMBODIMENTS

Figure 1:
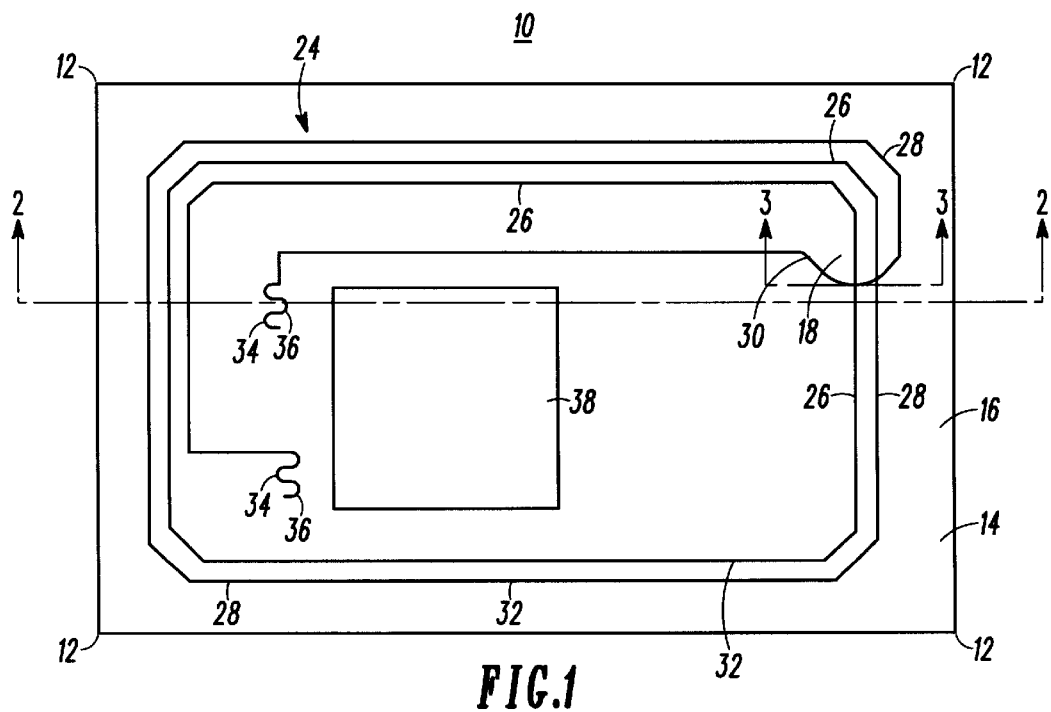
FIG. 1 illustrates a first embodiment of a card assembly in accordance with this invention, showing a second polymeric layer removed to better illustrate a loop antenna formed of a bare conductor.
Figure 2:
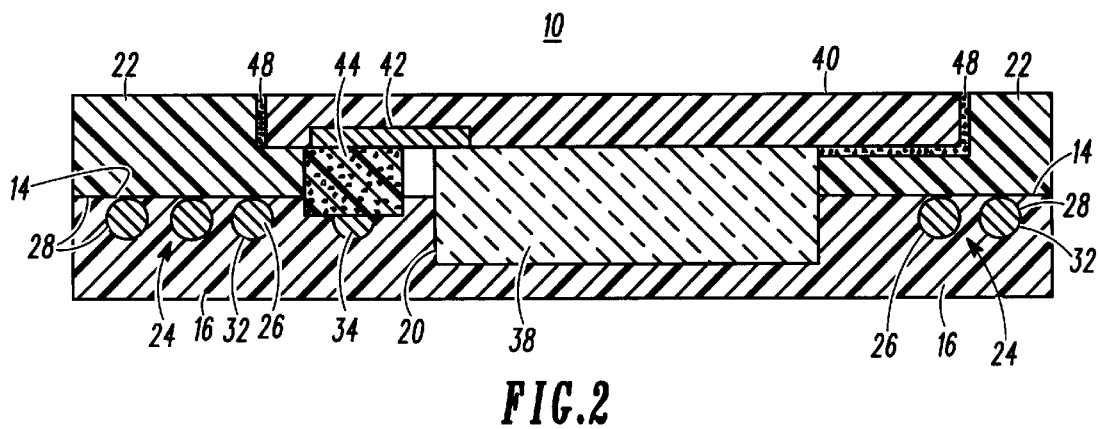
FIG. 2 illustrates a cross-section of the card assembly of FIG. 1, including the second polymeric layer, as viewed along reference line 2—2.
Figure 3:
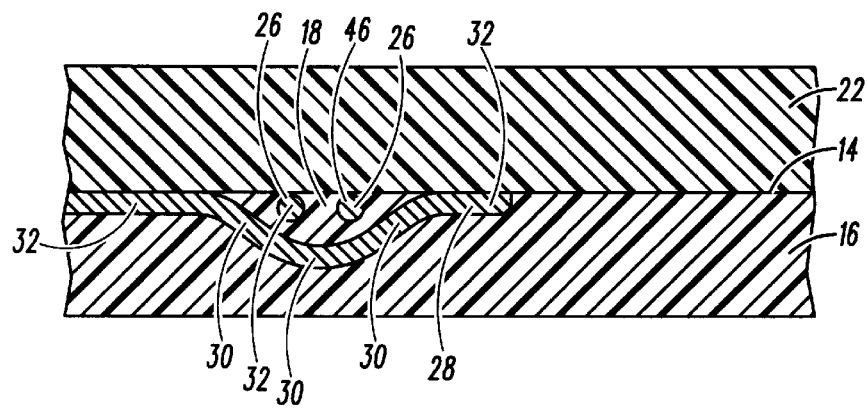
FIG. 3 illustrates a cross-section of the card assembly of FIG. 1, including the second polymeric layer, as viewed along reference line 3—3 in a cross-over region.

In accordance with a first embodiment of the card assembly 10 of the invention illustrated in FIG. 1 through FIG. 3, a card assembly 10 comprises a first polymeric layer 16 having a generally planar surface 14, an integrated circuit component 38 adjacent to or disposed in the first polymeric layer 16, and a loop antenna 24 formed of a bare conductor 32. The bare conductor 32 has ends 34. The loop antenna 24 comprises a first section 26, a second section 28, and a transverse section 30. The first section 26 is embedded into the first polymeric layer 16. The second section 28 is embedded into the first polymeric layer 16. The transverse section 30 is spaced apart from the first section 26 by a dielectric region. The transverse section 30 crosses the first section 26. The ends 34 are electrically coupled to the integrated circuit component 38. As used herein, electrically coupled shall mean electrically coupled, capacitively coupled, electromagnetically coupled, electrically connected, or the like.

Polymeric layers are preferably stacked to form a laminate card assembly 10. While the card assembly 10 may contain any number of polymeric layers, the card assembly 10 illustratively shown in FIG. 2 has a first polymeric layer 16 and a second polymeric layer 22. The second polymeric layer 22 overlies the first polymeric layer 16 and is affixed to the first polymeric layer 16.

In this embodiment, the first polymeric layer 16 preferably includes a dielectric region. The dielectric region preferably comprises a reflowed flash region 18 of the polymeric layer. As used herein, a reflowed flash region 18 is a thermoplastic region which has been melted in a localized area to accept, embed, or encapsulate the bare conductor 32. The dielectric region has a spacing between the first section 26 and the transverse section 30 which is sufficient to electrically insulate the first section 26 from the transverse section 30 at direct current (DC) potential. The spacing also provides adequate alternating current (AC) and/or radio frequency (RF) isolation between the first section 26 and the transverse section 30 at the operational frequency of the loop antenna. As used herein, embedding shall include: (1) partially placing the a bare conductor 32 into the first polymeric layer 16 such that the bare conductor 32 protrudes above the planar surface 14; (2) placing the bare conductor into the first polymeric layer 16 such that the bare conductor 32 is exposed at and flush with the planar surface 14; or (3) encapsulating the bare conductor 32 within the first polymeric layer 16. Polymeric material of the first polymeric layer 16 is displaced to form the flash region. The first polymeric layer 16 preferably has a recess 20 with a size and shape adapted to interlock with an integrated circuit component 38. As shown, the recess 20 has a generally rectangular or polyhedral shape. The first polymeric layer 16 contains a bare conductor 32. The bare conductor 32 preferably partially tracks a perimeter of the card and the first polymeric layer 16 by forming a perimetric outline.

In practice, the first polymeric layer 16 and the second polymeric layer 22 each preferably have a thickness of approximately seven to fifteen mils. However, the first polymeric layer 16, the second polymeric layer 22, and any other polymeric layers are not limited to any particular dimensions referenced herein. The first polymeric layer 16 and the second polymeric layer 22 are preferably composed of a thermoplastic, a thermoplastic blend, a thermoplastic composite, or any other suitable material that softens from a change in applied heat. While the first polymeric layer 16 and the second polymeric layer 22 may be composed of polyvinyl chloride (PVC) or polycarbonate, other suitable thermoplastic polymers, blends or polymeric composites may be used.

In an alternate embodiment a first outer polymeric layer covers the first polymeric layer and a second outer polymeric layer covers the second polymeric layer. The first outer polymeric layer and the second outer polymeric layer are preferably between approximately 1 mil and 5 mils thick. The first outer polymeric layer and the second outer polymeric layer form a durable protective sheath for the card assembly.

The bare conductor 32 is preferably bare metallic wire. As used herein, bare conductor 32 means an uninsulated wire, uninsulated filament, uninsulated cable, uninsulated solid wire, uninsulated stranded wire, linear metallic foil, a stamped conductor, an etched conductor, or any other suitable conductor without a dielectric sheathing. The bare conductor 32 of the loop antenna 24 has a first section 26, a second section 28, and a transverse section 30.

The first section 26 is preferably embedded into the first polymeric layer 16 at a first depth relative to the planar surface 14. The first depth is preferably substantially uniform. The first depth optimally has a range from a minimal depth to a maximum depth. The minimal depth approximately coincides with a geometric center point of the cross-sectional area 46 of the bare conductor 32 being aligned with the planar surface 14. The maximum depth is approximately equal to the entire cross-sectional area 46 of the bare conductor 32 being submerged into the first polymeric layer 16 under the planar surface 14. Ideally, the first depth exposes a peripheral portion of the first section 26 at the planar surface 14 such that the first section 26 is readily amenable to an electrical connection without milling of the bare conductor 32. The first depth may be selected such that a peripheral portion of the first section 26 slightly protrudes from the planar surface 14 to facilitate an electrical connection to the bare conductor 32. Accordingly, milling of the bare conductor 32 is not required in preparation for making an electrical connection to the bare conductor 32. The elimination of milling minimizes processing time during the embedding procedure, eliminates contamination from the milled conductor, and prevents distortion of the first polymeric layer 16 from potentially undue heating or pressure application during a protracted embedding process.

In the first embodiment, the first section 26 is defined as an inner turn 52 of the loop antenna 24. One or more inner turns 52 extend from one of the ends to the outermost turn 54. A second section 28 is preferably embedded into the first polymeric layer 16 at the first depth. In the first embodiment, the second section 28 is defined as the outermost turn of the loop antenna 24 and an extension 50 extending from the transverse section 30 to one of the ends 34. The outermost turn 54 extends from the inner turn 52. A transverse section 30 is embedded into or encapsulated by the first polymeric layer 16 at a second depth greater than the first depth. The transverse section 30 crosses the first section 26. The transverse section 30 also defines the boundary between the first section 26 and the second section 28 as the inner turn 52 becomes the outermost turn 54 after being intercepted by a projection of the transverse section 30. The portion of the bare conductor 32 directly underneath or above the transverse section 30 is included within the first section 26. The transverse section 30 adjoins a dielectric cross-over region of the loop antenna 24. The first section 26, which also adjoins the dielectric cross-over region or the reflowed flash region.

The bare conductor 32 is generally coplanar except at the transverse section 30. The transverse section 30 is generally curved around the first section 26. The transverse section 30 is preferably generally semi-elliptical around first section 26. The bare conductor 32 preferably comprises a solid uninsulated copper wire having a diameter within a range from approximately 2 mils to 20 mils, although other diameters of wire fall within the scope of the invention. The actual diameter is selected to obtain a desired operational impedance of the loop antenna 24 within an operational frequency range.

The cross-sectional diameter of the bare wire optionally approaches a full thickness of the first polymeric layer 16 or a full thickness of the entire card assembly 10 to maximize a potential quality factor (Q) of the loop antenna 24. Using a bare conductor, instead of insulated wire to form the loop antenna 24, increases the potential quality factor (Q) of the loop antenna 24 within a polymeric layer of limited thickness. The quality factor is a measure of the sensitivity and selectivity of the loop antenna 24. Enhanced selectivity of the loop antenna with an improved Q may reduce interference from other radio frequency transmissions or background noise.

Q represents a ratio of inductive reactance to resistance for the loop antenna 24. The insulation of the insulated wire may be replaced with a bare wire having an increased conductor diameter, substantially equivalent to the outer diameter of the insulated wire, including the insulation. The increased cross-sectional area of the bare wire versus the conductor in an insulated wire decreases the resistance of the loop antenna; hence, increases the potential Q of the loop antenna. The resistance of bare conductor 32 varies inversely to the cross-sectional area of the bare conductor 32. For example, a twenty-five percent increase in the cross-sectional area leads to a peak reduction of approximately twenty percent in the resistance over the resonant frequency range. If the cross-sectional area of the conductor were doubled, the resistance of the loop antenna would be reduced by as much as fifty percent over the resonant frequency range. The bare conductor may be composed of copper, nickel, aluminum, silver, gold, alloys of the foregoing metals, or other suitable metals.

The loop antenna 24 preferably has a perimetric outline and a suitable inductance for a resonant frequency of operation. Increasing a number of turns of the loop antenna 24 generally lowers the resonant frequency, if the spacing between adjacent turns remains constant or decreases. An optional capacitor may be placed in parallel with the loop antenna 24 across the ends 34 of the loop antenna to permit the loop antenna to operate at lower resonant frequencies than would otherwise be feasible. The perimetric outline partially tracks the perimeter of the first polymeric layer 16. The perimetric outline tends 34 to maximize the lengths of straight sections of the loop antenna 24.

In an alternate embodiment, the loop antenna may partially track the perimeter of the first polymeric layer to accommodate multiple loop antennas or dipole elements incorporated into a single card assembly. In yet another alternate embodiment, the loop antenna is located inward from the perimeter and does not track the perimeter of the card assembly.

The bare conductor 32 of the loop antenna 24 has ends 34. The ends 34 are electrically coupled or electrically connected to the integrated circuit component 38. The ends 34 preferably comprise serpentine segments 36 of the bare conductor 32. Each of the serpentine segments 36 is a generally winding or circuitous portion of the bare conductor 32, which increases the surface area contacting a conductive medium 44 or other suitable electrical connection between the integrated circuit component 38 and the loop antenna 24. As used herein, the conductive medium shall include a conductive adhesive, an eutectic solder, a low melting temperature solder alloy, a solder, a conductive paste, or the like. The serpentine segments 36 contribute to the electrical and mechanical integrity of the any of the following connections: (1) an electrical connection between the ends 34 and the traces 42 of the substrate 40 via a conductive medium 44, (2) an electrical connection directly between the ends 34 and the integrated circuit component 38 via a conductive medium 44, or (3) an electrical connection between the ends 34 and the lead frame via a conductive medium 44. The ends 34 may be milled slightly such that the cross-section of the wires have a rectilinear portion as shown. However, milling is not necessary so long as the bare conductor 32 is exposed at the planar surface 14 or slightly protruding above the planar surface 14 such that the bare conductor 32 is accessible for making an electrical connection thereto.

The card assembly 10 eliminates any requirement for milling, stripping, or etching away insulation at the ends 34 of the bare conductor 32. The ends 34 of the loop antenna 24 or another connection region of the loop antenna 24 readily adhere to a conductive medium. The conductive medium 44 preferably forms a reliable electrical and mechanical connection between the loop antenna 24 and the substrate 40.

The conductive medium preferably comprises a conductive adhesive. A conductive medium 44 may comprise a polymeric matrix comprising a polymeric precursor and electrically conductive particles dispersed in the polymeric precursor, which is subsequently cured. The electrically conductive particles may comprise metallic-coated dielectric cores, metallic particles, metallized dielectric globules, or the like. The dielectric core may comprise glass, a ceramic material, or a plastic, such as polystyrene. The conductive medium 44 may comprise an epoxy-based polymeric precursor with metallic particles dispersed therein. The conductive adhesive adjoins the ends 34 or another connection region of the loop antenna 24. The metallic particles may comprise, silver particles, copper particles, aluminum particles, or the like at concentrations sufficient to form a low resistance electrical path (i.e. attenuation of less than 1 dB) for signals at the resonant frequency of operation.

The loop antenna 24 has turns arranged to resonate within a certain frequency range at a predetermined impedance. More particularly, the loop antenna 24 of a bare conductor 32 comprises turns arranged to resonate within a certain frequency range at a predetermined inductance. The preferential frequency range is greater than or equal to 10 MHz, although other frequency ranges fall within the scope of the invention. The turns preferably follow each other and are equidistantly spaced apart sufficiently to predictably yield a desired mutual inductance. The loop and its turns preferably partially track a perimeter of the card assembly 10. Accordingly, the loop antenna 24 is preferably generally rectangular as illustrated in FIG. 2. The bare conductor 32 is substantially coplanar except at the transverse section 30. The generally angular bends in the bare conductor 32 near corners 12 of the card may deviate from completely orthogonal bends as shown.

In an alternate embodiment, the bends 34 near the corners may be curved. Likewise, the turns of the loop antenna may be curved and equidistantly spaced apart from one another. In yet other embodiments, the loop antenna may form a spiral of a bare conductor.

A substrate 40 is preferably embedded into the second polymeric layer 22. An integrated circuit component 38 is mounted on the substrate 40 and located within the recess 20. The substrate 40 may comprise a printed circuit board, a flexible circuit board, a lead frame, or another electrical interface to the integrated circuit component 38. The substrate 40 preferably comprises a dielectric base and traces 42 patterned on the dielectric base. The dielectric base may be made from a polymer, a plastic, a polymer composite, an organic composite (i.e. FR4), a ceramic, or another dielectric. The traces 42 are electrically and mechanically connected to leads, electrodes, or solder bumps of the integrated circuit component 38. The substrate 40 is preferably adhesively bonded to the first polymeric layer 16 by a dielectric adhesive 48. The substrate may comprise a copper, nickel, copper-alloy, or nickel-alloy lead frame electrically connected to the integrated circuit component.

In an alternate embodiment, the substrate may be a double-sided printed circuit board which allows electrical communication between an external device and the integrated circuit component 38 via either (1) the loop antenna or (2) a capacitive or direct electrical connection to one side of the printed circuit board.

The integrated circuit component 38 preferably comprises one or more active and passive components fabricated on a semiconductor substrate. The active and/or passive components are connected to external electrical interconnections through internal metallizations within the integrated circuit component 38. The integrated circuit component 38 may comprise a microprocessor with memory. Electrodes of the integrated circuit are preferably mechanically and electrically connected to traces 42 on the substrate 40. The integrated circuit is sometimes referred to as a microcontroller or a memory chip. In alternate embodiments, multiple integrated circuit components or chips may be housed within a single smart card assembly.

Figure 4:
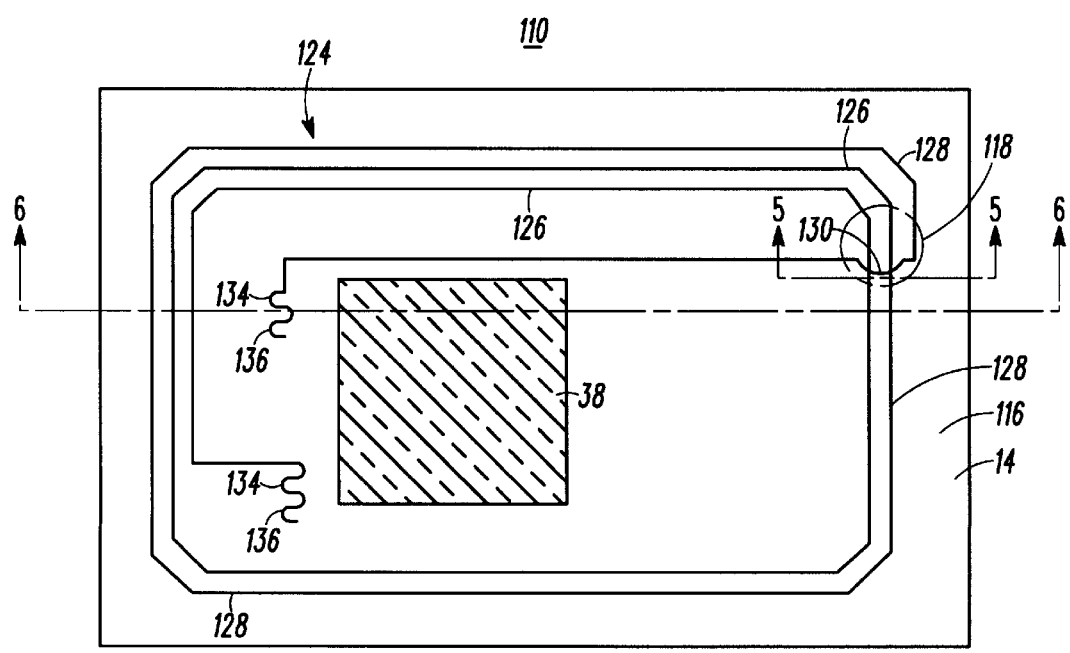
FIG. 4 illustrates a second embodiment of a card assembly in accordance with this invention with a second polymeric layer removed to better illustrate a loop antenna formed of a bare conductor.
Figure 5:
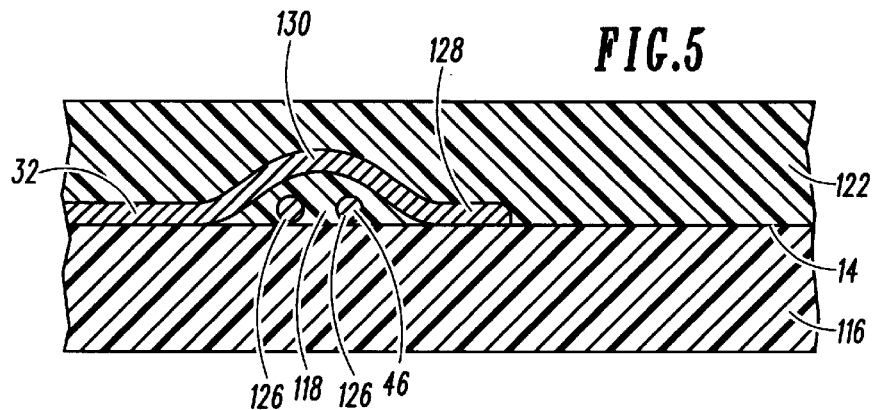
FIG. 5 illustrates a cross-section of the card assembly of FIG. 4, including the second polymeric layer, as viewed along reference line 5—5 in a cross-over region.
Figure 6:
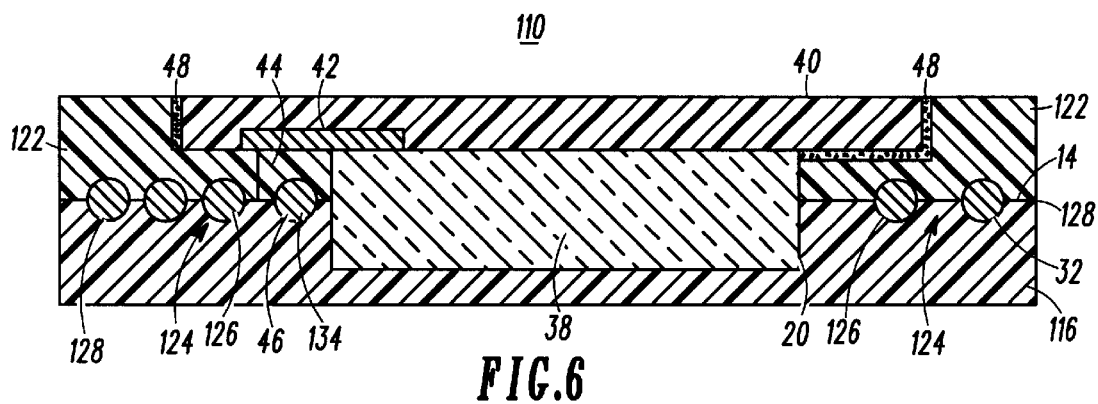
FIG. 6 illustrates a cross-section of the card assembly of FIG. 4, including the second polymeric layer, as viewed along reference line 6—6.

A second embodiment of the card assembly 110 is illustrated in FIG. 4 through FIG. 6. The card assembly 110 of the second embodiment includes a dielectric cross-over region comprising a dielectric insert 118 separating the transverse section 130 from the first section 126 of the bare conductor 32. The dielectric insert 118 preferably is dispensed during the embedding of the bare conductor 32 to form the loop antenna 124. The loop antenna 124 comprises a first section 126 and a second section 128 which aggregately form a coplanar portion of the loop antenna 124.

In the second embodiment, the first depth in the first polymeric layer 116 coincides with a geometric center point of the bare conductor 32 being coplanarly aligned with a planar surface 14 of the first polymeric layer 16. A first depth that is coextensive with the geometric center point of the bare conductor 32 may be referred to as the minimal depth. The minimal depth is adequate to maintain sufficient adhesion and structural integrity between the bare conductor 32 and the first polymeric layer 116, while preventing an abrupt bending radius from routing the transverse section 130 over the dielectric insert 118. The bending radius is preferably gradual where the bare conductor 32 leaves the coplanar portion within the polymeric layer and extends from the coplanar portion as the transverse section 130. A gradual bending radius facilitated by a sufficiently thin dielectric insert 118 minimizes mechanical stress on the bare conductor 32 and contributes toward the card assembly's reduced susceptibility to bending damage.

The dielectric insert 118 preferably comprises a polymeric insert which is dispensed in a dispensable state, such as a fluidic or spreadable state. The dielectric insert 118 is preferably dispensed as an uncured polymer or a polymeric precursor. The dielectric insert 118 comprises a body or a globule of sufficient thickness to form a reliable dielectric barrier between the transverse region 130 and the first section 126. The dielectric insert 118 has sufficient adhesion to reliably bond to the bare conductor 32(i.e. copper wire). A second polymeric layer 122 preferably overlies the first polymeric layer 116 and the dielectric insert 118.

The loop antenna 124 has ends 134 which preferably protrude above the planar surface 14 to facilitate the formation of an electrical connection at the ends 134 to the integrated circuit component or traces 42 of a substrate 40. The ends 134 are preferably curved or serpentine segments 136 such that the bonding surface area of the ends 134 is increased to promote a reliable electrical and mechanical connection with the conductive medium 44.

Figure 7:
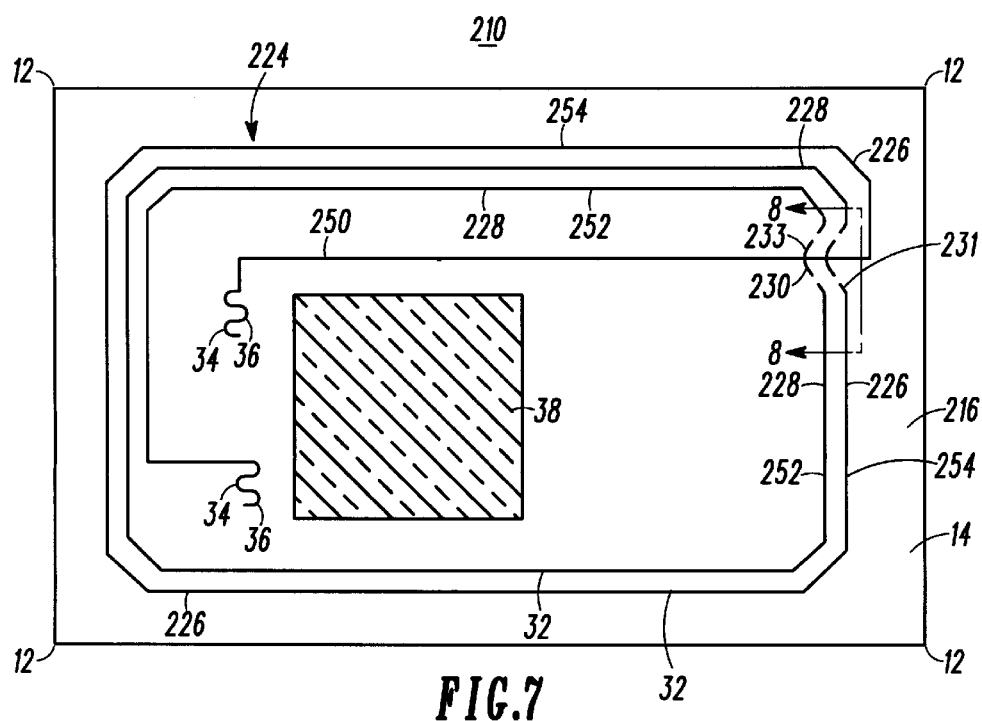
FIG. 7 illustrates a third embodiment of a card assembly with a second polymeric layer removed to better illustrate a loop antenna formed of a bare conductor.
Figure 8:
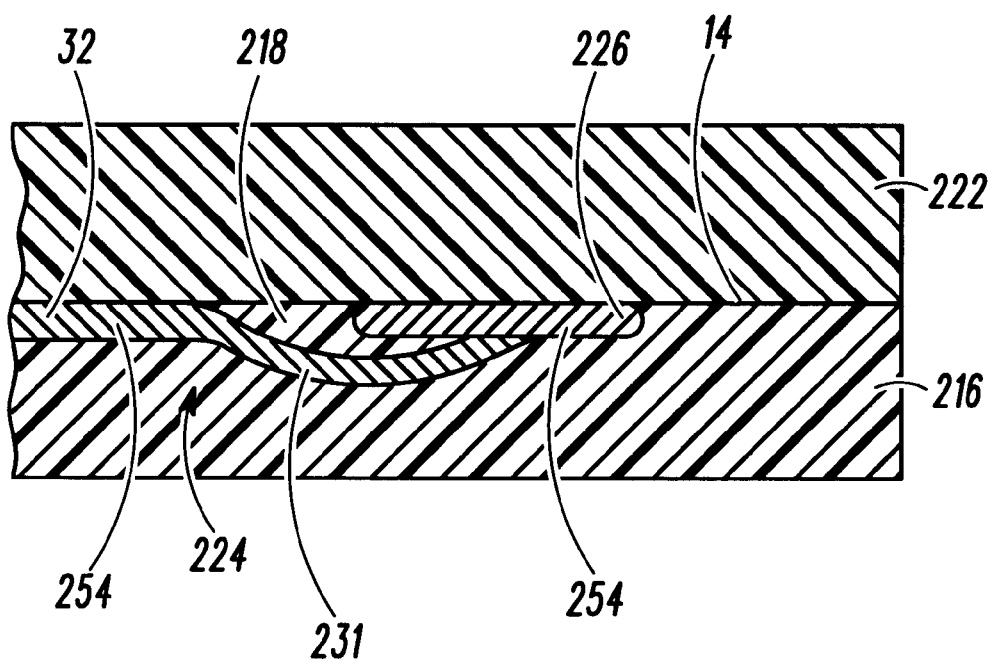
FIG. 8 illustrates a cross-section of the card assembly of FIG. 7, including the second polymeric layer, as viewed along reference line 8—8.

FIG. 7 and FIG. 8 illustrate a third embodiment of the card assembly 210 which is similar to the first embodiment of FIG. 1 through FIG. 3 except: (1) the first section 226 in the third embodiment refers to an extension 250 and the outermost turn 254 of the loop antenna 224, rather than the inner turn 52; (2) the second section 228 in the third embodiment refers to the inner turn 252 of the loop antenna 224, rather than the outer turn 54: (3) the third embodiment has a plurality of transverse sections 230 associated with the inner turn 252, rather than one transverse section 30 associated with the outer turn 54.

FIG. 8 illustrates a first transverse section 231 and an extension 250 underneath the first transverse section 231. The first transverse 231 section of FIG. 8 blocks the view of the second transverse section 233 which generally mirrors a shape and size of the first transverse section 231. Accordingly, each inner turn of FIG. 7 has a transverse section 230 separated from the first section 226 by a dielectric region. The first section 226 and the second section 228 form a common plane, while the transverse sections 230 lie outside the common plane. The first section 226 comprises an outermost turn 254 and an extension 250 extending from the outermost turn 254 to one of the ends 34 and wherein the second section 228 comprises an inner turn 252. The dielectric region preferably comprises a reflowed flash region 218 similar to the reflow flash region previously described in conjunction with the first embodiment of the card assembly. The reflowed flash region has a sufficient thickness to electrically insulate the first section 226 from the transverse sections 230. The loop antenna 224 is embedded into the first polymeric layer 216, which is covered by the second polymeric layer 222.

Another aspect of the invention comprises a method of forming a card assembly, including the steps of: (a) embedding a first section (i.e. 26, 126, or 226) of a loop of bare conductor 32 into a polymeric layer (i.e. 16, 116, 216) at a first depth; (b) embedding a second section (i.e. 28, 128, or 228) of the loop into the polymeric layer at a first depth; (c) crossing the first section of the loop with a transverse section (i.e. 30, 130, or 230) of the loop extending from the second section and separated from the first section; (d) spacing the transverse section from the first section by a dielectric region associated with the polymeric layer; (e) fabricating a substrate 40 having conductive traces 42; (f) mounting an integrated circuit 38 onto the substrate 40; and (g) electrically connecting the traces 42 to the loop.

Embedding the conductor into the polymeric layer may be accomplished by any one of three alternate techniques: (1) ultrasonic embedding, (2) thermal-compression embedding, and (3) thermosonic embedding. Ultrasonic embedding refers to the application of sufficient energy to cause vibration of the bare conductor against the planar surface 14, which in turn causes localized heating of the thermoplastic first polymeric layer. Thermal-compression embedding uses a combination of heat and compression to cause localized melting of the thermoplastic first polymeric layer. Thermosonic embedding is a combination of ultrasonic and thermal compression.

In accordance with the first embodiment previously described with reference to FIG. 1 through FIG. 3, the crossing of the first section 26 further comprises embedding the transverse section 30 at a second depth into the first polymeric layer 16. The second depth is greater than the first depth. The second depth may vary, while the first depth is preferably constant or substantially uniform. To obtain the change in depth between the first depth and the second depth, the transverse section 30 of the loop is embedded into the first polymeric layer 16 through the application of greater force, or a higher energy level, than used for the embedding of the first section 26 of the loop. For ultrasonic embedding, the embedding of the transverse section is typically carried out at a higher amplitude than the first section and the second section are. However, the same ultrasonic frequency may be used to embed the transverse section 30, the first section 26, and the second section 28. Accordingly, the transverse section 30 of the loop may be embedded into the first polymeric layer 16 at a greater force or pressure than typically used. The greater force produces the transverse section 30 with a curved dip around the first section 26. The change in energy level is preferably gradual or a step function with sufficiently small amplitude changes in ultrasonic energy such that the profile of the transverse section gradually curves to meet a coplanar level of the first section and the second section of the conductor relative to the planar surface 14. The greater pressure preferably produces the transverse region with a substantially semi-elliptical profile around the first section.

In accordance with the second embodiment previously described with reference to FIG. 4 through FIG. 6, the method alternately may further comprise dispensing or placing a dielectric insert 118 over the first section 126 prior to crossing the first section 126 with the transverse section 130. The dielectric insert preferably comprises a polymeric insert in a liquid state, a solid state, a semi-solid state, a gelatinous state, or another dispensable state. The dielectric insert may comprise (1) a liquid that is sprayed or dispensed, or (2) a thin, flexible sticker made from an elastomer, plastic, paper, or wood. The dielectric insert is sufficiently thin so that the dielectric insert does not protrude from an exterior planar surface of the finished card. The dielectric insert is sufficiently flexible to endure bending, accompanying typical intended use of the card, without comprising the insulating properties of the card.

In any of the foregoing embodiments, the bare conductor may be terminated in a serpentine pattern adapted to receive a conductive medium (i.e. conductive adhesive). A recess 20 may be formed a polymeric layer. The recess 20 is preferably adapted to receive the integrated circuit component 38. The recess 20 may be formed by molding the first polymeric layer in a mold, machining, routing, milling, or by other suitable techniques. A second polymeric layer may be affixed over the polymeric layer by an adhesive, or any suitable laminating process. While the loop antenna has been embedded in the first polymeric layer in the above illustrative examples, the loop antenna may be embedded into any polymeric layer of card. For example, the loop antenna may be embedded into an intermediate or middle layer of a multi-layer polymeric card.

Various illustrative embodiments of the card incorporating a bare conductor and the method for forming the card assembly have been described in this specification. Accordingly, the scope of the present invention is defined by reference to the following claims which are further exemplary of the present invention.

We claim:

1. A card assembly comprising:

a polymeric layer having a generally planar surface; an integrated circuit component adjacent to the polymeric layer;

a loop antenna formed of a bare conductor having ends, the loop antenna comprising a first section embedded into the polymeric layer at a first depth relative to the generally planar surface, a second section embedded into the polymeric layer, and a transverse section, the transverse section crossing the first section and embedded into the polymeric layer at a second depth relative to the generally planar surface greater than the first depth, the ends being electrically coupled to the integrated circuit component; and a dielectric region interposed between the first section and transverse section, the dielectric region spacing apart the first section from the transverse section to electrically insulate the first section from the transverse section.

2. The card assembly according to claim 1 wherein the dielectric region comprises a reflowed flash region of the polymeric layer.

3. The card assembly according to claim 1 wherein the dielectric region comprises a dielectric insert separating the transverse section from the first section.

4. The card assembly according to claim 1 further comprising at least one additional polymeric layer affixed to the polymeric layer, the bare conductor comprising a bare wire having a cross-sectional diameter approaching a full thickness of the card assembly.

5. The card assembly according to claim 1 further comprising a conductive medium electrically connecting the ends to the integrated circuit component, the bare conductor comprising a bare wire having a cross-sectional diameter approaching a full thickness of the polymeric layer.

6. The card assembly according to claim 1 wherein the first section comprises an inner turn and wherein the second section comprises an outermost turn and an extension extending from the transverse section to one of the ends.

7. The card assembly according to claim 6 wherein the transverse section defines a boundary between the inner and outermost turn.

8. The card assembly according to claim 1 wherein the first section comprises an outermost turn and an extension extending from the outermost turn to one of the ends and wherein the second section comprises an inner turn.

9. The card assembly according to claim 8 wherein the transverse section defines a boundary between the inner turn and outermost turn.

10. The card assembly according to claim 8 further comprising a second transverse section of the loop antenna equidistantly spaced apart from the first section, the second transverse section mirroring the transverse section.

11. A card assembly comprising:
a polymeric layer having a generally planar surface;
an integrated circuit component adjacent to the polymeric layer;
a loop antenna formed of a bare conductor having ends, the loop antenna comprising a first section embedded into the polymeric layer at a first depth relative to the planar surface, a second section embedded into the polymeric layer at the first depth, and a transverse section embedded into the polymeric layer at a second depth greater than the first depth, the transverse section crossing the first section, the ends being electrically coupled to the integrated circuit component.

12. The card assembly according to claim 11 wherein the bare conductor is generally coplanar except at the transverse section.

13. The card assembly according to claim 11 wherein the transverse section is generally curved around the first section.

14. The card assembly according to claim 11 wherein the transverse section is generally semi-elliptical around first section.

15. The card assembly according to claim 11 wherein the bare conductor comprises a copper wire having a diameter within a range from approximately 2 mils to 20 mils.

16. The card assembly according to claim 11 wherein the bare conductor comprises a bare wire having a cross-sectional diameter approaching a full thickness of the polymeric layer.

17. The card assembly according to claim 11 wherein the card assembly further comprises at least one additional polymeric layer affixed to the polymeric layer, and wherein the bare conductor comprises a bare wire having a cross-sectional diameter approaching a full thickness of the card assembly.

18. The card assembly according to claim 11 wherein the ends comprise a serpentine segment of the bare conductor.

19. A card assembly comprising:
a thermoplastic polymeric layer having a generally planar surface;
a substrate having traces, the substrate being affixed to the polymeric layer;
an integrated circuit component having electrodes electrically connected to the traces;
a loop antenna formed of a bare metallic wire having ends, the loop antenna comprising an inner turn embedded into the polymeric layer at a first depth relative to the planar surface, an outermost turn embedded into the polymeric layer at the first depth, and a transverse section encapsulated within the polymeric layer at a second depth greater than the first depth, the transverse section crossing the inner turn;
a conductive medium electrically connecting the traces to the ends of the loop antenna.

20. The card assembly according to claim 19 wherein the bare conductor is generally coplanar except at the transverse section.

21. The card assembly according to claim 19 wherein the transverse section is generally curved around the inner section.

22. The card assembly according to claim 19 wherein the transverse section is generally semi-elliptical around the inner section.

23. The card assembly according to claim 19 wherein the bare conductor comprises a copper wire having a diameter within a range from approximately 2 mils to 20 mils.

24. The card assembly according to claim 19 wherein the loop antenna has a perimetric outline and an inductance yielding a resonant frequency of greater than 10 MHz.

25. The card assembly according to claim 19 wherein the ends comprise a serpentine segment of the bare conductor.

26. A method for forming a card assembly comprising the steps of:
embedding a first section of a loop of bare conductor into a polymeric layer at a first depth;
embedding a second section of the loop into the polymeric layer at a first depth;
crossing the first section of the loop with a transverse section of the loop extending from the second section and embedded into the polymeric layer at a second depth greater than the first depth;
spacing the transverse section from the first section by a dielectric region associated with the polymeric layer;
fabricating a substrate having conductive traces;
mounting an integrated circuit onto the substrate; and
electrically connecting the traces to the loop.

27. The method according to claim 26 wherein crossing the first section further comprises embedding the transverse section at a second depth into the polymeric layer, the second depth being greater than the first depth.

28. The method according to claim 26 further comprising the step of:
dispensing a dielectric insert over the first section prior to crossing the first section with the transverse section.

29. The method according to claim 26 wherein crossing the first section of the loop comprises ultrasonically embedding the transverse section into the substrate at a greater energy than the first section.

30. The method according to claim 26 wherein crossing the first section of the loop comprises thermally, compressively embedding the transverse section into the substrate at a greater force than the first section.

31. The method according to claim 26 wherein crossing the first section of the loop comprises thermosonically embedding the transverse section into the substrate at a greater force than the first section.

32. The method according to claim 26 wherein the variable time per unit displacement produces the transverse section with a curved dip around the first section.

33. The method according to claim 26 wherein the variable time per displacement produces the transverse region having a substantially semi-elliptical profile around the first section.

34. The method according to claim 26 further comprising the step of:

terminating the bare conductor in a serpentine pattern adapted to receive a conductive medium.

35. The method according to claim 26 further comprising the steps of:

forming a polymeric layer having a recess adapted to receive the integrated circuit component;

affixing a second polymeric layer over the polymeric layer.

* * * * *